US007277083B2

(12) United States Patent
Duncan

(10) Patent No.: US 7,277,083 B2
(45) Date of Patent: Oct. 2, 2007

(54) ERGONOMICALLY DESIGNED COMPUTER GAMING DEVICE

(76) Inventor: Thomas M. Duncan, 9 Downing St., Rome, GA (US) 30161

( * ) Notice: Subject to any disclaimer, the term of this patent is extended or adjusted under 35 U.S.C. 154(b) by 603 days.

(21) Appl. No.: 10/858,081

(22) Filed: Jun. 2, 2004

(65) Prior Publication Data

US 2005/0083297 A1   Apr. 21, 2005

Related U.S. Application Data

(60) Provisional application No. 60/511,655, filed on Oct. 17, 2003.

(51) Int. Cl.
*G09G 5/00* (2006.01)
*A01F 11/06* (2006.01)
*G06F 3/01* (2006.01)
*B68G 5/00* (2006.01)

(52) U.S. Cl. .................. 345/156; 463/37; 463/38; 463/47; 200/5 R; 200/6 R; 200/61.1; 715/701; 715/702; 248/118; 248/691

(58) Field of Classification Search ........ 345/156–169, 345/184; 463/37, 38, 47; 341/20, 21; 248/118, 248/298, 595; 715/701, 702; 200/5 R, 6 R, 200/61.1; D14/400, 402, 405, 406, 412, D14/416
See application file for complete search history.

(56) References Cited

U.S. PATENT DOCUMENTS

| | | | |
|---|---|---|---|
| 5,648,798 A | 7/1997 | Hamling | 345/163 |
| 5,831,597 A | 11/1998 | West et al. | 345/163 |
| 5,838,307 A | 11/1998 | Bouton | 345/168 |
| 5,896,125 A * | 4/1999 | Niedzwiecki | 345/168 |
| 5,945,646 A * | 8/1999 | Miller et al. | 200/5 R |
| 6,068,554 A | 5/2000 | Tyler | 463/38 |
| 6,075,516 A | 6/2000 | Rice | 345/156 |
| 6,084,575 A | 7/2000 | Oktay | 345/167 |
| 6,184,869 B1 | 2/2001 | Harding et al. | 345/163 |
| 6,222,526 B1 | 4/2001 | Holmes | 345/161 |
| 6,262,715 B1 | 7/2001 | Sawyer | 345/163 |
| 6,377,245 B1 | 4/2002 | Park | 345/163 |
| 6,441,805 B1 | 8/2002 | Reid et al. | 345/163 |
| 6,489,948 B1 | 12/2002 | Lau | 345/163 |
| 6,545,667 B1 | 4/2003 | Lilenfield | 345/169 |
| 6,599,194 B1 * | 7/2003 | Smith et al. | 463/30 |
| 6,765,502 B2 * | 7/2004 | Boldy et al. | 341/22 |
| 7,113,171 B2 * | 9/2006 | Vayda | 345/167 |
| 2001/0003713 A1 | 6/2001 | Willner et al. | 463/37 |
| 2003/0030625 A1 | 2/2003 | Kauk et al. | 345/169 |

FOREIGN PATENT DOCUMENTS

WO   WO 02/01589   1/2002

* cited by examiner

*Primary Examiner*—Henry N Tran

(57) ABSTRACT

An ergonomically designed gaming device for a user that includes a semi-flattened hemispherical ovoid base, that is contoured into a general hand imprint shape with finger and thumb grooves and fingertip provisions to accommodate the user's index finger, middle finger, ring finger, little finger and thumb. A plurality of adjustment screws on the thumb side allows for tilting adjustments for the general hand imprint shape. A plurality of tactile buttons and dual rocker switches are provided in the fingertip recesses for the user to operate functions normally performed from a keyboard in a computer game.

10 Claims, 4 Drawing Sheets

ERGONOMICALLY DESIGNED COMPUTER GAMING DEVICE

CROSS-REFERENCE TO RELATED APPLICATION

This application claims the benefit of U.S. Provisional Patent Application Ser. No. 60/511,655, filed Oct. 17, 2003.

BACKGROUND OF THE INVENTION

1. Field of the Invention

The present invention generally relates to computer gaming accessories. More specifically, the invention relates to an ergonomically designed computer gaming device in the form of a shooter's mitt or shooter's glove.

2. Description of the Related Art

Computer games continue to become more and more sophisticated as time goes on. As these computer games become more sophisticated, so must the devices that run and control these computer games. Many of these evolved devices are reflected in the related art.

U.S. patent application Publication No. 2001/0003713 published on Jun. 14, 2001, outlines the use of a hand held gaming and data entry system with an ergonomic housing that includes thumb operated controls which generate a first set of electrical signals, and finger operated controls which generate a second set of electrical signals when operated independently. U.S. patent application Publication No. 2003/0030625 published on Feb. 13, 2003, outlines the use of a data entry device especially designed for computers that has two joysticks or control handles that are equipped with keys so that they combine the functions of a keyboard and a mouse. The main keys contain the alphabet. Using special shift keys that are operated by thumb, their assignment is switched to numbers, special characters, text cursor functions or control functions.

U.S. Pat. No. 5,648,798 issued to Hamling on Jul. 15, 1997, outlines the use of a device that functions as either a mouse, a trackball or combination of both and allows the user to achieve a neutral operating position. This positioning, preferred by occupational therapists, forms the basis of the numerous ergonomic advantages of the invention. The invention permits neutral positioning by providing a formed hand support pad on top of a lower housing on which the side of the user's hand rests.

U.S. Pat. No. 5,831,597 issued to West et al. on Nov. 3, 1998, outlines the use of a computer device that is used in conjunction with a mouse input device. The computer input device of the invention has a body having a resilient layer covered by a surface layer textured throughout the entirety of the surface for operation of the mouse. A printed circuit card is incorporated in the body between the resilient layer and the upper surface layer and includes a plurality of capacitive touch sensor pads.

U.S. Pat. No. 5,838,307 issued to Bouton on Nov. 17, 1998, outlines the use of a reconfigurable video game and simulator system that includes a personal computer, a video display, a keyboard, and one or more game controllers including a throttle controller. The keyboard is coupled to the throttle controller as are the other game controllers. The throttle controller is coupled to the computer through a keyboard interface port.

U.S. Pat. No. 5,896,125 issued to Niedzwiecki on Apr. 20, 1999, outlines the use of an adapter which is coupled to a keyboard and one or multiple video game control devices, including widely available directional game pads and joysticks designed for other video game platforms. The adapter is in turn coupled to the keyboard port of a personal computer. During the function mode, button presses or other input decision actions observed at the video game controller result in a key scan code being sent to the personal computer's keyboard port based on a user-defined association list.

U.S. Pat. No. 6,068,554 issued to Tyler on May 30, 2000, outlines the use of a hand manipulated dual controller assembly for use with action video games. It has a base with a trackball type controller mounted in one recess in the top surface of the base and a joystick type controller mounted in another recess in the top surface of the base. By using the joystick controller, the player can separately move the action video game character in any desired direction and by using the trackball controller, allow the character to look with his eyes in any desired direction.

U.S. Pat. No. 6,075,516 issued to Rice on Jun. 13, 2000, outlines the use of a palm rest for use with a computer data entry device such as a computer keyboard, that minimizes alleviated posture and stress-related disorders associated with the use of computer devices. The palm rest includes a hand-support section that is substantially rectangular-shaped to allow the fingers of a user to readily access the computer keyboard, a base, and a curvilinear section that couples the hand-support section to the base.

U.S. Pat. No. 6,084,575 issued to Oktay on Jul. 4, 2000, outlines the use of a computer device having an oblong shape following the general outline of a human hand with a finger portion, a palm portion and a thumb portion. The finger portion accommodates three levers, which are operated by contact from the user's fingers. The palm portion fits the palm of a right or left hand comfortably and has a trackball judiciously placed so as to fit the cup of the hand ergonomically.

U.S. Pat. No. 6,184,869 issued to Harding et al. on Feb. 6, 2001, outlines the use of a computer input device having multiple multi-directional detection devices that can be simultaneously operated by a user to provide multi-dimensional input to a computer. The multi-directional detection devices are arranged on an input device housing to facilitate simultaneous operation by one hand of an operator.

U.S. Pat. No. 6,222,526 issued to Holmes on Apr. 24, 2001, outlines the use of a hand-held ergonomic computer controller that includes a housing having a lower extent taking the form of a grip and an upper extent with a cross-sectional area greater than that of the lower extent. At least one button is mounted on the housing. Also included is either a trackball or a joystick mounted on the upper extent of the housing.

U.S. Pat. No. 6,262,715 issued to Sawyer on Jul. 17, 2001, outlines the use of an improved ergonomic computer mouse that provides comfortable and efficient usage by maintaining the hand of a user at a large acute angle to the horizontal. This is accomplished by a device that includes a base having an upstanding pedestal structure about which the palm and hands of the user extends in a more natural handshake manner at a large acute angle to the horizontal where the user's wrist remains straight while grasping the mouse.

U.S. Pat. No. 6,377,245 issued to Park on Apr. 23, 2002, outlines the use of an ultra ergonomic computer mouse that includes an angled grip-rod which, when held and placed in the correct manner, supports and influences all of the fingers and the hand to be in a naturally curved position. It also includes a contoured and grooved rubber foundation, which is shaped in such a way that the hand holding this mouse is put in a natural position and is greatly supported.

U.S. Pat. No. 6,441,805 issued to Reid et al. on Aug. 27, 2002, outlines the use of a manually movable computer mouse with a mouse movement sensing system for providing mouse movement signals and at least one user finger operable control switch, for providing control signals for a graphic user interface, the mouse having a boomerang-shaped body ergonomically shaped to fit and support the user's hand in a naturally relaxed curled hand position.

U.S. Pat. No. 6,489,948 issued to Lau on Dec. 3, 2002, outlines the use of a mouse that provides multiple cursor control input devices. A first input device is a tracking ball. The second input device may be another tracking ball, a finger pad, or a joystick, among other input devices. The second input device provides a secondary control of cursor movement that is combined with the input of the first input device to provide full cursor control.

U.S. Pat. No. 6,545,667 issued to Lilenfield on Apr. 8, 2003, outlines the use of a cursor control device to be used in conjunction with a computer, receiver or other processing unit that allows for convenient and comfortable use while being hand-held or while resting on a desktop. The cursor control device has a body with a shape for fitting in a user's hand so the user can operate the cursor control device in hand-held or desktop uses.

W.I.P.O. Patent Publication Number WO 02/01589 granted to Brookfield et al. on Jan. 3, 2002, outlines the use of a user-input device for use with all game simulations that require separate controls for movement and viewing or control over the orientation of the user within the game simulation. The user-input device has two controller units that plug into input ports of the computer or game port of a gaming system. The left hand controller enables a user to walk in 8 directions, while the right hand controller enables a player to look in any angle of horizontal direction while looking up and down in the vertical direction.

Although each of these patents and publications outline novel and useful devices, what is really needed is an ergonomically designed computer gaming device that is custom designed for a person's hand and can be utilized by touch only (without the user looking at the device). Such a device would be in great demand in the marketplace, particularly for more sophisticated games.

None of the above inventions and patents, taken either singly or in combination, is seen to describe the instant invention as claimed. Thus an ergonomically designed computer gaming device solving the aforementioned problems is desired.

SUMMARY OF THE INVENTION

The present invention is an ergonomically designed gaming device for a user that includes a semi-flattened hemispherical ovoid upper shell pivotally mounted on a flat, ovoid base. The upper shell is contoured into a general hand imprint shape with finger and thumb grooves and fingertip provisions to accommodate the user's index finger, middle finger, ring finger, little finger and thumb. A plurality of adjustment screws is provided for tilting adjustments for the general hand imprint shape. A plurality of tactile buttons and dual rocker switches are provided in the fingertip provisions for the user to incorporate into a computer game.

The shell is tilted so that the thumb rests higher than the little finger, the thumb resting almost on its side in the thumb groove. The upper shell may be tilted by rocking the hand slightly about the axis of the wrist. Rocking the upper shell clockwise about the axis of the wrist operates one switch mounted on the base beneath the upper shell, while rocking the upper shell counterclockwise about the axis of the wrist operates another switch mounted on the base beneath the shell. Operation of the switches mounted in the finger grooves, the thumb grooves, and beneath the shell allows the user to duplicate functions normally performed by the computer keyboard while resting his or her hand on the ergonomically designed computer device by very slight pressures of the fingertips, the thumb, or the wrist.

Accordingly, it is a principal object of the invention to move keyboard functions in a computer game from the computer keyboard to an ergonomically designed computer device which requires only slight pressure applied by the fingertips, thumb, or wrist of a single hand, while simultaneously resting the hand.

It is another object of the invention to provide an ergonomically designed computer gaming device that can be operated by touch, without looking at the ergonomically designed computer gaming device.

It is a further object of the invention to provide an ergonomically designed computer gaming device that can accommodate a large range of hand and finger sizes.

Still another object of the invention is to provide an ergonomically designed computer gaming device that is comfortable on a user's hand and wrist.

It is an object of the invention to provide improved elements and arrangements thereof for the purposes described which are inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
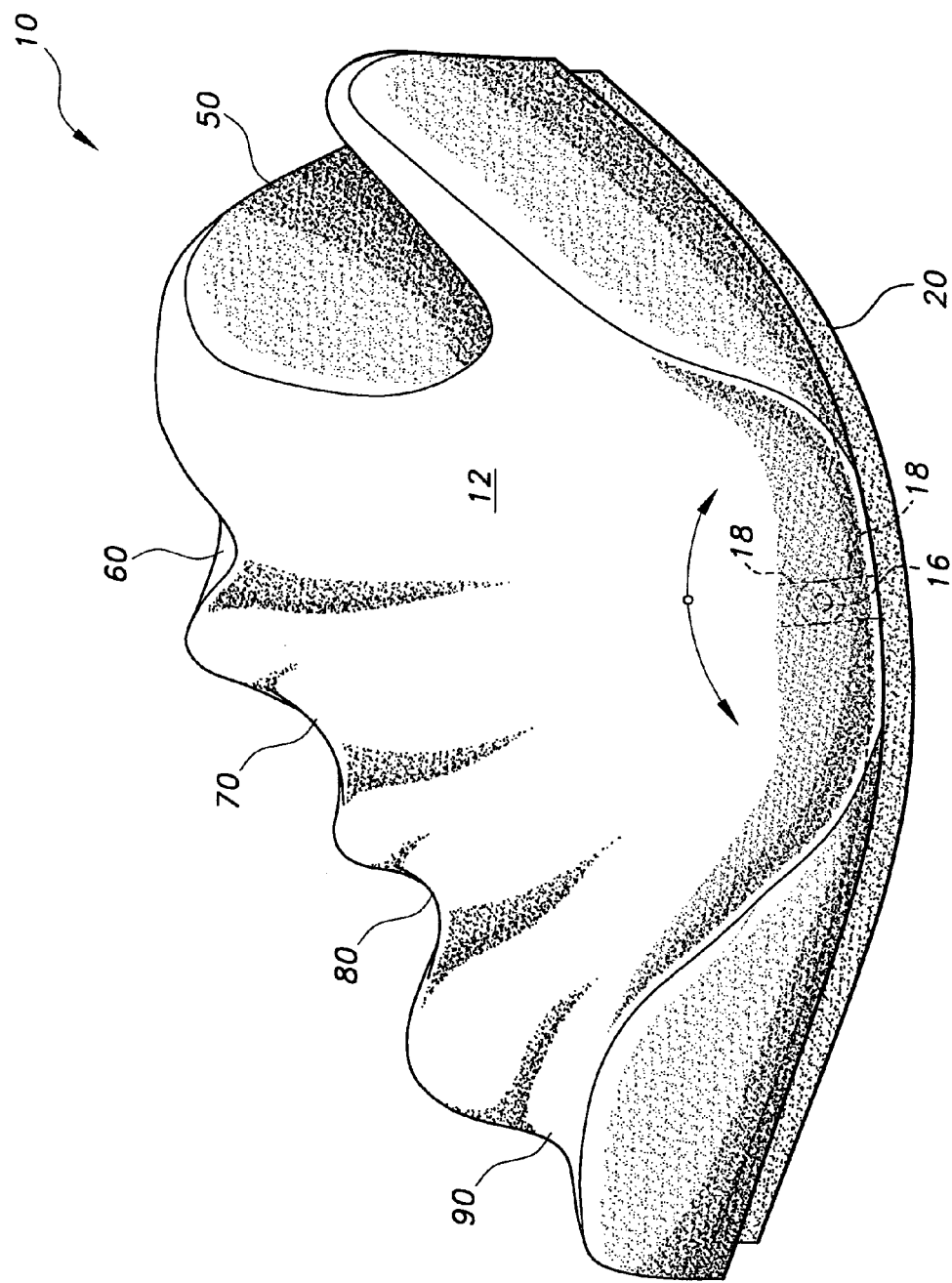
FIG. 1 is a rear perspective view of an ergonomically designed computer gaming device according to the present invention.
Figure 2:
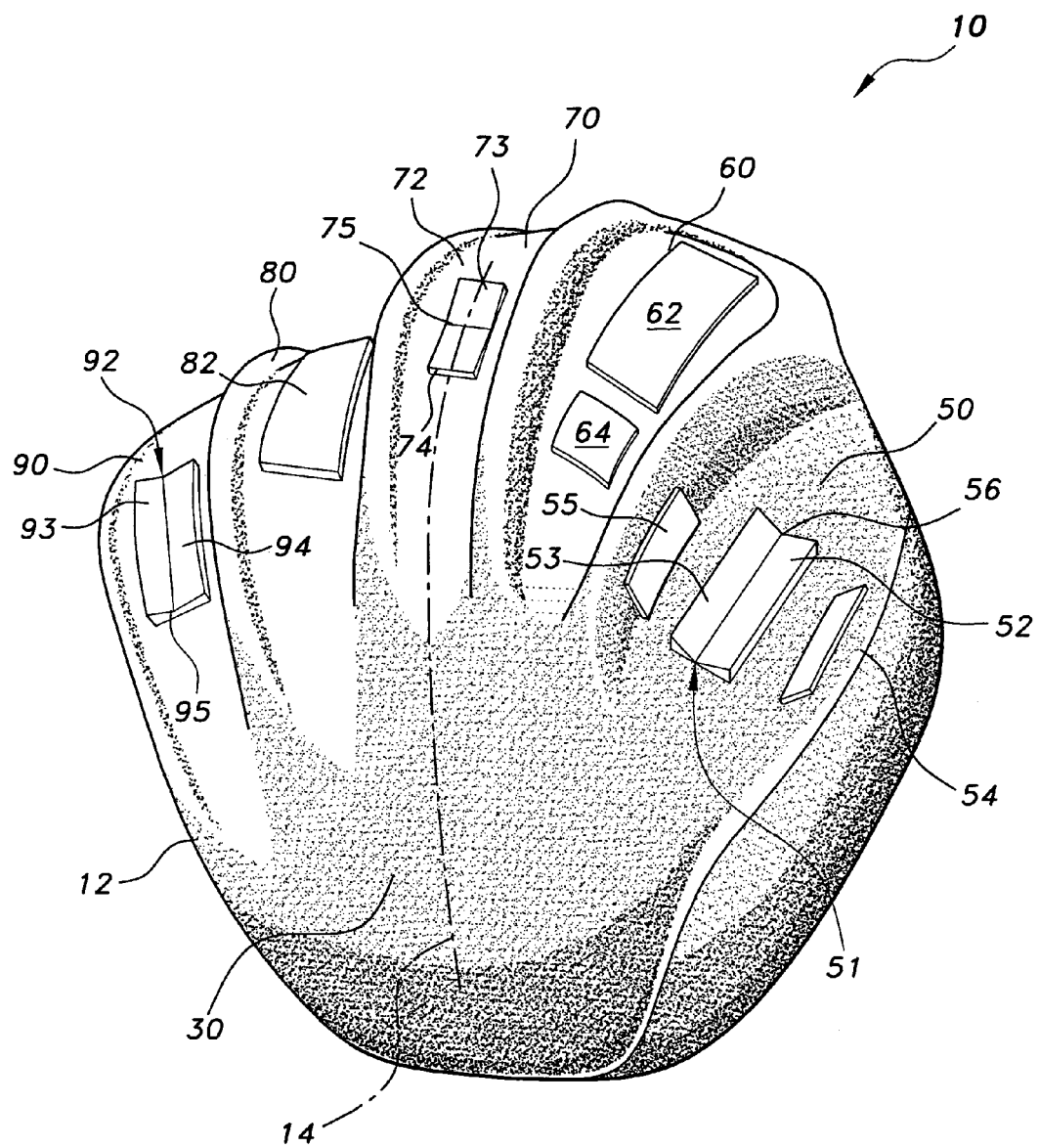
FIG. 2 is a top view of the ergonomically designed computer gaming device according to the present invention.

The present invention is an ergonomically designed computer gaming device 10, as shown in FIGS. 1 and 2. The ergonomically designed computer gaming device 10 comprises a semi-flattened hemispherical upper shell 12 pivotally mounted on a flat, planar base 20. Both the upper shell 12 and the base 20 are substantially ovoid in shape when viewed in plan view, as seen in FIG. 2. As viewed from the rear or palm depression, the upper shell 12 is not symmetrical. Rather, the upper shell 12 is tilted, as seen most clearly in FIG. 1. The degree of tilt may be approximated by placing ones hand on a flat surface, cupping the hand, and rotating the wrist to raise the thumb about two inches above the flat surface.

The upper shell 12 is contoured into a general hand imprint shape 30 having a depression for receiving the palm, finger and thumb grooves, and fingertip recesses to accommodate the user's index finger, middle finger, ring finger, little finger and thumb. A plurality of tactile buttons and dual rocker switches, described further below, are provided in the fingertip recesses for the user to activate as part of a computer game in lieu of a computer keyboard. The upper shell 12 rotates slightly, preferably about 5° clockwise and about 5° counterclockwise, about an axis 14 which extends from about the center of the palm depression through the tip of the middle finger groove in order to operate two normally open momentary switches disposed between the upper shell 12 and the base 20. The pivot mechanism may be an elongated shaft 16 extending along the axis 14 with hinges 18 extending from the base 20 and the upper shell 12 mounted on the ends of the shaft 16, by two separate hinges mounted at opposite ends of the shaft 18, by a detent mechanism, or by any other conventional pivot mechanism known in the art. The upper shell 12 may be maintained in a central or neutral position by one or more bias springs (FIG. 4, 40) which prevent accidental triggering of the momentary switches disposed beneath the upper shell 12. A plurality of adjustment screws (FIG. 4, 40) on the thumb side allow for tilting the base 20 up for adjustments for the general hand imprint shape 30.

The ergonomically designed computer gaming device 10 can be used to control movement in computer games and can be adapted to console game machines as well. The primary use of the ergonomically designed computer gaming device 10 is for games of the First Person Shooter type, but can be useful for other games as well. It is intended for use by the user's left hand, which is the hand normally used for movement by right handed persons, but can be made in such a manner that it could be used by left handed users as well.

The ergonomically designed computer gaming device 10 has a fingertip provision for the index finger groove 60 of the general hand imprint shape 30 that includes a third and a fourth tactile button 62, 64. Both the third and fourth tactile buttons 62, 64 are hinged at one end and are approximately 1.00" to 0.75" in length to allow for different users' U hand sizes. The third tactile button 62 is hinged at the end being furthest from the palm of the user, while the fourth tactile button 64 is hinged at the end being closest to the palm of the user. Both the third tactile button 62 and the fourth tactile button 64 follow the general contour of the index finger groove 60. The ends of the third tactile button 62 and the fourth tactile button 64 that are not hinged should be fairly close together, since the index finger has a high degree of dexterity and the movement from the third tactile button 62 and the fourth tactile button 64 is a relatively natural movement.

The ergonomically designed computer gaming device 10 has a fingertip provision for the middle finger groove 70 of the general hand imprint shape 30 that includes a second dual rocker switch 72. The second dual rocker switch 72 is similar to the first dual rocker switch 51 except the operation of the second dual rocker switch 72 is perpendicular to the middle finger groove 70 of the general hand imprint shape 30. The second dual rocker switch 72 should be higher at each of the top and bottom ends 73,74 and taper down to a bevel at the axis of the second dual rocker switch 75. This design allows the middle finger of the user to rest in the center on the axis of the second dual rocker switch 75. The second dual rocker switch 72 should be approximately 1.00" long and be as wide as the middle finger groove 70. The second dual rocker switch 72 is designed so a slight push forward of a user's middle finger activates the top end of the second dual rocker switch 73 and a slight pull backwards activates the bottom end of the second dual rocker switch 74.

The ergonomically designed computer gaming device 10 has a fingertip provision for the ring finger groove 80 of the general hand imprint shape 30 that includes a fifth tactile button 82. The fifth tactile button 82 is similar to the third tactile button 62 and is hinged at the end furthest from the user's palm and is approximately 0.75" long. The ring finger has a low degree of dexterity and can really only accommodate a single tactile button. The fifth tactile button 82 follows the general contours of the ring finger groove 80 and should be about as wide as the ring finger groove 80.

The ergonomically designed computer gaming device 10 also has a fingertip provision for the small finger contour 90 of the general hand imprint 30, which is a third dual rocker switch 92. The third dual rocker switch 92 is approximately 1.00" long and 0.75" wide. There is a left side 93 and a right side 94 that are separated by the axis of the third dual rocker switch 95. The outer edges of the third dual rocker switch 92 should be slightly raised and taper down to a bevel at the axis of the third dual rocker switch 95. This also allows the user's little finger to rest naturally along the axis of the third dual rocker switch 95 when not in use.

Figure 3:
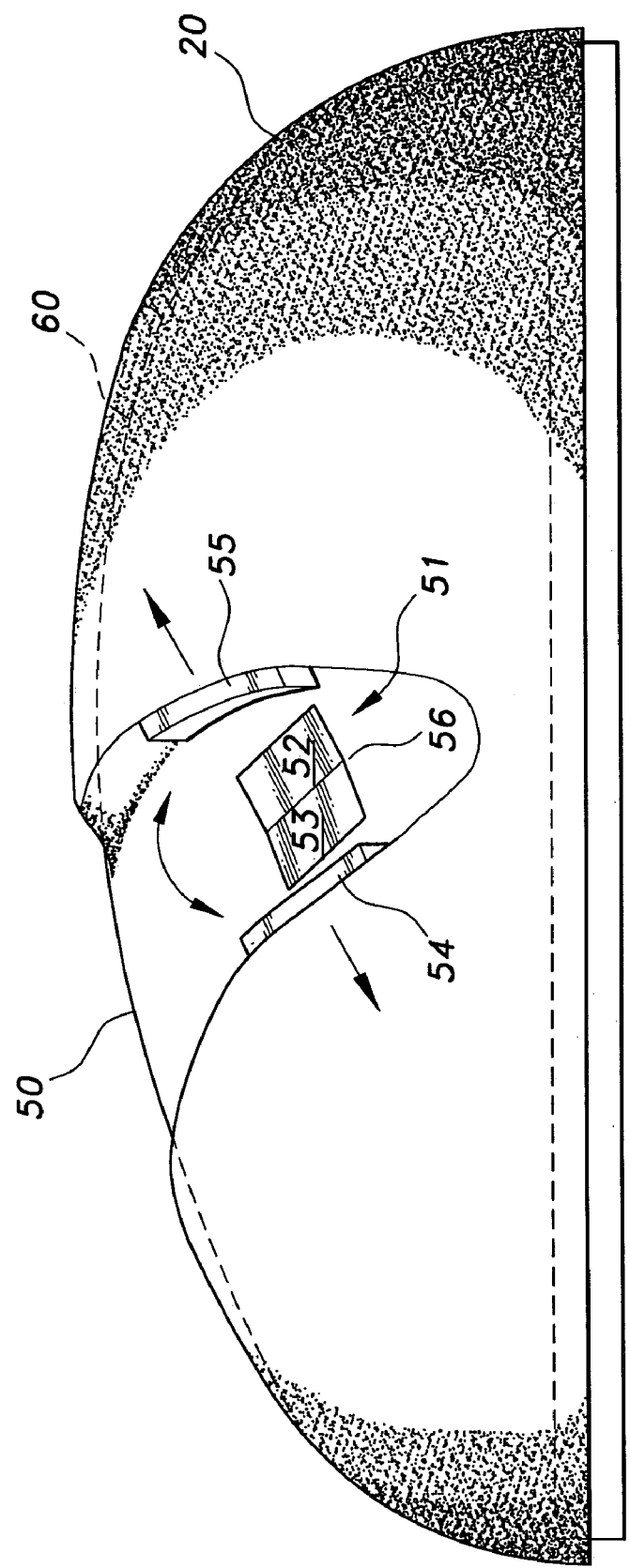
FIG. 3 is a side perspective view of the ergonomically designed computer gaming device, particularly showing details of the thumb groove.

Referring to FIGS. 2 and 3, the ergonomically designed computer gaming device 10 has fingertip provisions for the thumb groove 50 of the general hand imprint shape 30 which include a first dual rocker switch 51 with two sides 52, 53 and a first and second tactile button 54, 55 on each side of the thumb groove 50. Note that the thumb groove 50 for a user's thumb to lie in is slightly wider than what is proportional to the user's hand. This is to allow for an up and down movement of the user's thumb within the thumb groove 50 to activate the first dual rocker switch 51 and the first and second tactile buttons 54, 55 within the thumb groove 50.

The first tactile button 54 is molded into the bottom of the thumb groove 50, the bottom being that portion of the thumb groove 50 that if the user's thumb were to go limp, it would rest on the first tactile button 54. The second tactile button 55 is located opposite the first tactile button 54 on the top of the thumb groove 50. The first and second tactile buttons 54, 55 are of low actuation force because a user must raise his or her thumb off of the first dual rocker switch 51 to operate the first or second tactile buttons 54, 55. The first and second tactile buttons 54, 55 give the user a click or some felt feedback to let a user know when they have been activated and should be generally flush with the contours of the thumb groove 50. The first dual rocker switch 51 should be raised at its outer edges along the centerline pivot point 56 to allow for ease of actuation. The surface pads of the first dual action switch 51 is the area where a user's thumb touches the first dual rocker switch 51 to activate a side of it and should be approximately 1.00" to 1.25" long. This allows users U with different hand sizes to use the same ergonomically designed computer gaming device 10.

The first dual rocker switch 51 is beveled down its edges to the centerline pivot point 56. To activate either side of the first dual rocker switch 51, the user must apply a slight pressure upward to activate the first side of the first dual rocker switch 52 and a slight pressure downward to activate the second side of the first dual rocker switch 53. The design of the first dual rocker switch 51 allows a user to roll his or her thumb up or down to use the first dual rocker switch 51 or raise his or her thumb to activate the first tactile button 54 or the second tactile button 55.

All of the tactile buttons and dual rocker switches described above are preferably flush-mounted with the surface of the finger grooves. Operation of the dual rocker switches and tactile buttons substitute for operation of selected keys of a computer keyboard. Control cables to the computer have also been omitted from FIGS. 1-3 for clarity in the drawings.

Figure 4:
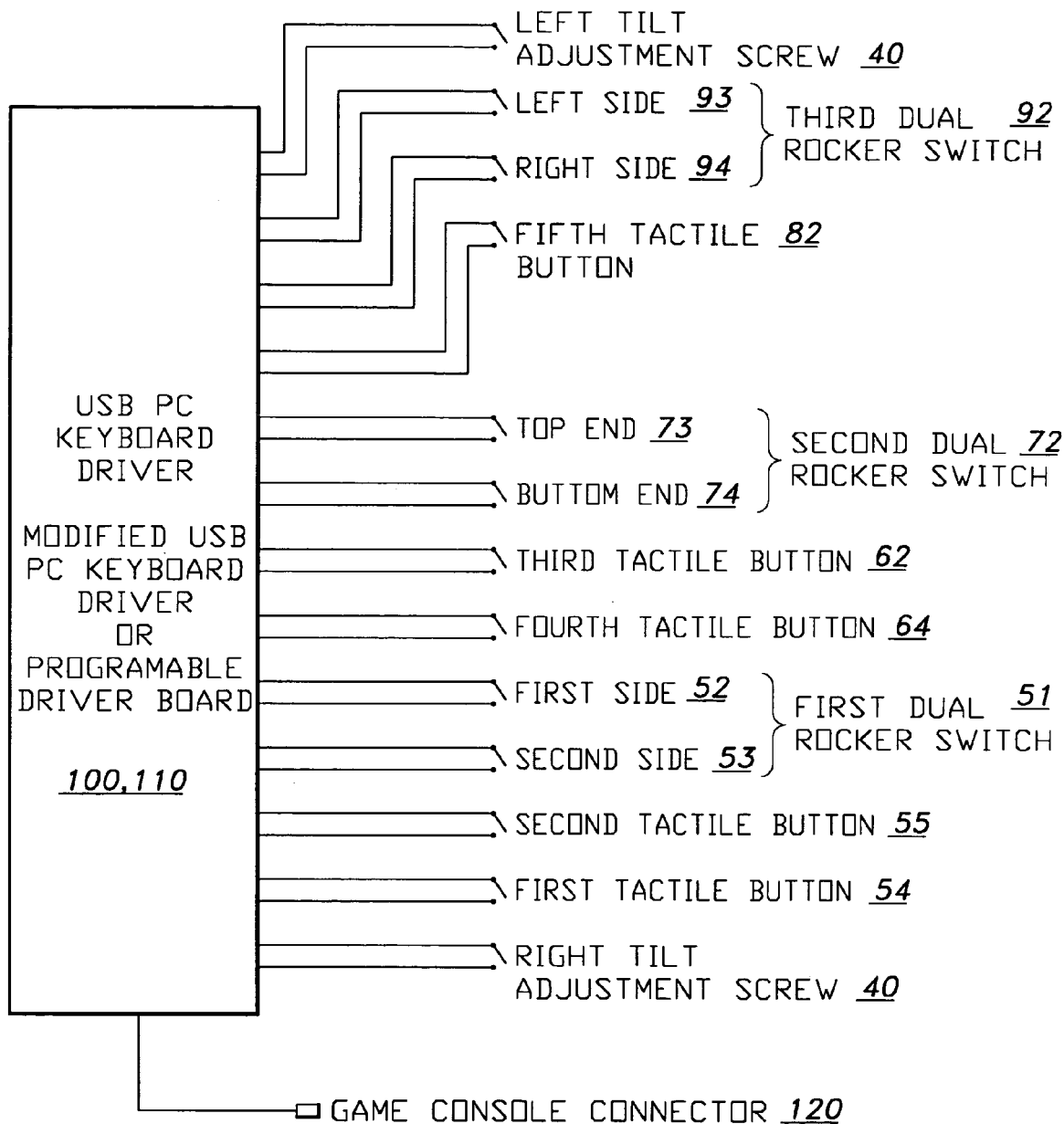
FIG. 4 is an electrical diagram of the ergonomically designed computer gaming device.

As depicted in FIG. 4, the ergonomically designed computer gaming device 10 can be tied into a USB personal computer keyboard driver 100 or a modified USB personal computer keyboard driver 110. Additionally, a user can also tie the ergonomically designed computer gaming device 10 into a game console connector 120 as well. All of the dual rocker switches 51, 72, 92, tactile buttons 54, 55, 62, 64, 82 and the plurality of adjustment screws 40 have electrical switches that can be tied into a USB personal computer keyboard driver 100 or a modified USB personal computer keyboard driver 110. The USB personal computer keyboard driver 100 or modified USB personal computer keyboard driver 110 can then be connected to a game console connector 120 if the user U desires.

It is to be understood that the present invention is not limited to the embodiment described above, but encompasses any and all embodiments within the scope of the following claims.

I claim:

1. An ergonomically designed computer gaming device for controlling functions in a computer game, the gaming device comprising:
   a flat and planar base;
   a semi-flattened hemispherical upper shell pivotally mounted on the base, the upper shell being a generally ovoid dome having an upper surface, the upper surface having a concave palm depression and a plurality of concave grooves, each respectively adapted for receiving a user's index finger, middle finger, ring finger, little finger and thumb therein, the upper surface tilting upward from the little finger groove to the thumb groove; and
   a plurality of tactile buttons and dual rocker switches mounted in the index finger groove, the middle finger groove, the ring finger groove, the little finger groove and the thumb groove, the tactile buttons and dual rocker switches being adapted for electrical connection to a computer.

2. The device according to claim 1, wherein the thumb groove includes a first dual rocker switch with two sides, a first tactile button and a second tactile button.

3. The device according to claim 1, wherein the index finger groove includes a third tactile button and a fourth tactile button.

4. The device according to claim 1, wherein the middle finger groove includes a second dual rocker switch.

5. The device according to claim 4, wherein the second dual rocker switch is perpendicular to the middle finger groove.

6. The device according to claim 1, wherein the ring finger groove includes a fifth tactile button.

7. The device according to claim 1, wherein the little finger groove includes a third dual rocker switch.

8. The device according to claim 1, wherein all of the dual rocker switches, tactile buttons and game console connector are tied into a USB personal computer keyboard driver.

9. The device according to claim 1, wherein all of the dual rocker switches, tactile buttons and game console connector are tied into a modified USB personal computer keyboard driver.

10. The device according to claim 1, wherein all of the tactile buttons, dual rocker switches and game console connector are tied into a programmable driver board.

* * * * *